United States Patent
Theis

(10) Patent No.: US 6,718,429 B1
(45) Date of Patent: Apr. 6, 2004

(54) CONFIGURABLE REGISTER FILE WITH MULTI-RANGE SHIFT REGISTER SUPPORT

(75) Inventor: Jean-Paul Theis, Hamburg (DE)

(73) Assignee: AnteVista GmbH, Hamburg (DE)

( * ) Notice: Subject to any disclaimer, the term of this patent is extended or adjusted under 35 U.S.C. 154(b) by 142 days.

(21) Appl. No.: 10/089,372

(22) PCT Filed: Aug. 22, 2000

(86) PCT No.: PCT/EP00/08178
§ 371 (c)(1),
(2), (4) Date: Mar. 29, 2002

(87) PCT Pub. No.: WO02/17071
PCT Pub. Date: Feb. 28, 2002

(51) Int. Cl.$^7$ .............................................. G06F 12/00
(52) U.S. Cl. ........................ 711/101; 711/109; 711/149; 711/170
(58) Field of Search ................................. 711/101, 109, 711/149, 170; 365/189.02, 189.12, 230.05

(56) References Cited

U.S. PATENT DOCUMENTS

| | | | | |
|---|---|---|---|---|
| 5,493,687 A | * | 2/1996 | Garg et al. ..................... 712/23 |
| 5,523,979 A | * | 6/1996 | Nemazie ................. 365/230.05 |
| 5,828,623 A | * | 10/1998 | Dilbeck ................. 365/230.05 |
| 5,835,405 A | * | 11/1998 | Tsui et al. ..................... 365/182 |
| 6,343,356 B1 | * | 1/2002 | Pechanek et al. ........... 712/210 |
| 6,370,637 B1 | * | 4/2002 | Meier et al. ................. 712/215 |
| 2001/0014930 A1 | * | 8/2001 | Soderquist .................. 711/109 |

FOREIGN PATENT DOCUMENTS

| | | | | |
|---|---|---|---|---|
| EP | 0657802 A2 | * | 6/1995 | ............. G06F/5/01 |
| GB | WO-99-61997 A | * | 12/1999 | ........... G06F/15/78 |

OTHER PUBLICATIONS

International Search Report, Application No. PCT/EP00/08178, pp 1–3, Jul. 16, 2001.*

Ercanli et al., "A Register File and Scheduling Model for Application Specific Synthesis," pp 35–40, IEEE, Jun. 1996.*

Zalamea et al., "Two–level Hierarchical Register File Organization for VLIW Processors," pp137–146, IEEE, Dec. 2000.*

Lopez et al., "Widening resources: a cost–effective technique for aggressive ILP architectures," pp 237–246, IEEE, Dec. 1998.*

* cited by examiner

Primary Examiner—Matthew Kim
Assistant Examiner—Stephen Elmore

(57) ABSTRACT

The present invention introduces a configurable register file architecture of a processing device (microprocessor, CPU, DSP) with multi-range shift register support. Said register file has two working modes which can be simultaneously active such that in addition to behaving as a conventional register file, said register file can also be configured such that the registers of said register file form one or more shift registers whose ranges are specified by dedicated 'range control' inputs of said register file. By incorporating the functionality of shift registers into the register file, register renaming is achieved at almost no hardware overhead, allowing furthermore a reduction in overall power consumption and machine code size. Shifting of the register contents of the shift register is only done when a valid ALU (FPU) computation result is written into a register, this being notified to said register file by setting the gated clock input and a so called 'shift' input of said register file to appropriate values.

4 Claims, 2 Drawing Sheets

Figure 1 : Prior Art

CONFIGURABLE REGISTER FILE WITH MULTI-RANGE SHIFT REGISTER SUPPORT

1. FIELD OF THE INVENTION

The present invention relates to the field of architecture design of data processing devices. More specifically, the invention is dealing with architecture design and functionality issues of register files used inside data processing devices.

2. CONVENTIONS, DEFINITION OF TERMS, TERMINOLOGY

The term 'data processing device' has a very broad meaning and stands for terms like microprocessor, central processing unit (CPU), digital signal processor (DSP), application specific integrated circuit (ASIC), application specific standard product (ASSP), application specific instruction set processor (ASIP). The term 'register file' has the same meaning as used throughout the literature and is intimately related to the terms 'microprocessor', 'CPU' and 'DSP'. A register file represents an important building block of a data processing device (microprocessor, CPU, DSP). It comprises a set of registers used to store intermediate computation results as well as to store data loaded from memory/cache. Usually, a register file has one or more read and write ports as well as one or more read and write address ports. The write/read address ports determine the registers to/from which data are written/read respectively. A complete description of usual (conventional) register files is given in section 3. As mentioned before, the present invention is dealing with architecture design and functionality issues of register files. Although the scope of the present invention is independent of any specific register-transfer level architecture and implementation of a register file, the description of the drawings in section 4 will rely on a specific register-transfer level architecture, this with the goal to ease the explanation of the exact functionality of such a register file.

The register-transfer level architecture of a register file can be thought of as consisting of a limited number of elementary building blocks with which the register file is built up. It typically comprises registers, crossbars and multiplexers as address logic. The register-transfer level architecture of a register file is an equivalent graphical representation of the functionality of a register file. Furthermore, the functionality of a register file can be exactly deduced from a given register-transfer level architecture. Therefore, the register-transfer level architecture is a convenient means to explain the functionality of a register file. Usually, implementation details like amplifiers, buffers, latches and registers which might be inserted between or inside elementary building blocks, are not considered as being relevant for the register-transfer level architecture since, although they may change the timing (due to the insertion of buffers, latches and registers), they do not change the functionality. Follows some terminology concerning crossbars. A crossbar is a building block that makes connections between its data inputs and data outputs via the signals which are applied to the control inputs of the crossbar. A fully connected crossbar is able to connect any data input to one, more or even all data outputs. A partially connected crossbar is able to connect any data input to one or more but not all data outputs. Multiplexers/demultiplexers are crossbars with one data input output and one or more data outputs/inputs respectively.

In all the figures that follow, arrows represent either bussed connections between building blocks or between bussed inputs and bussed outputs of building blocks, where the bus width of a bussed connection or of a bussed input and output is equal to one or more bits.

3. PRIOR ART

In the following sections, it is assumed that all mentioned ports and inputs are driven by digital signals having a finite set of possible values, this set usually comprising at least logical '0', logical '1' and high impedance 'Z'.

FIG. 1 shows the register transfer level architecture of a 'conventional' register file as based on the prior art and which contains several data read and data write ports. The data write ports are connected to the data inputs of a crossbar whose data outputs are connected to the data inputs of the registers of the register file. The data outputs of the registers are connected to the data inputs of a second crossbar whose data outputs are connected to the data read ports of the register file. The connections made by the two crossbars are controlled by the address signals applied to the write and read address ports, the write and read address ports being connected to the control inputs of said crossbars. In this way, the values applied to the write address ports determine the registers whose contents are going to be (over)written with the values applied to the data write ports of the register file whereas the values applied to the read address ports determine the registers whose contents are going to be read out via the data read ports. Normally, there are as many read and write address ports as there are data read and write ports of the register file. Furthermore, to each read port and each write address port is normally associated one data read and one write port respectively. Usually, as many register contents can be read simultaneously as there are data read ports. The same holds true for the write address ports data and write ports, with the exception that it is normally forbidden that two write address ports specify the same register to be written with two different values. Finally, it should be noted that normally register files have a clock input which is connected to the clock input of the registers of the register file. It means that the writing or reading of a specific register content happens either on the falling or on the rising edge of said clock signal. In other words the registers are clocked either on the falling or rising clock edge of said clock signal while the read and write address signals applied to the read and write address ports as well as the values applied to the write ports must be valid on the rising or falling clock edge.

A major drawback of such a conventional register file is that it does not support register renaming by itself. Register renaming is required to increase instruction level parallelism in order to achieve higher data processing rates and performance without deteriorating the utilization of the register file. Therefore, with such a conventional register file register renaming is only possible with additional hardware circuitry doing dynamic register (re)allocation and scheduling. This however implies higher power consumption as well as higher implementation and production costs.

The configurable register file as based on the present invention allows to solve this problem by inherently performing register renaming with only a small hardware overhead.

4. SUMMARY OF THE INVENTION

The present invention concerns a register file of a data processing device (microprocessor, DSP, CPU) according to claim 1.

5. BRIEF DESCRIPTION OF THE DRAWINGS

6. DETAILED DESCRIPTION OF THE DRAWINGS

Figure 2:
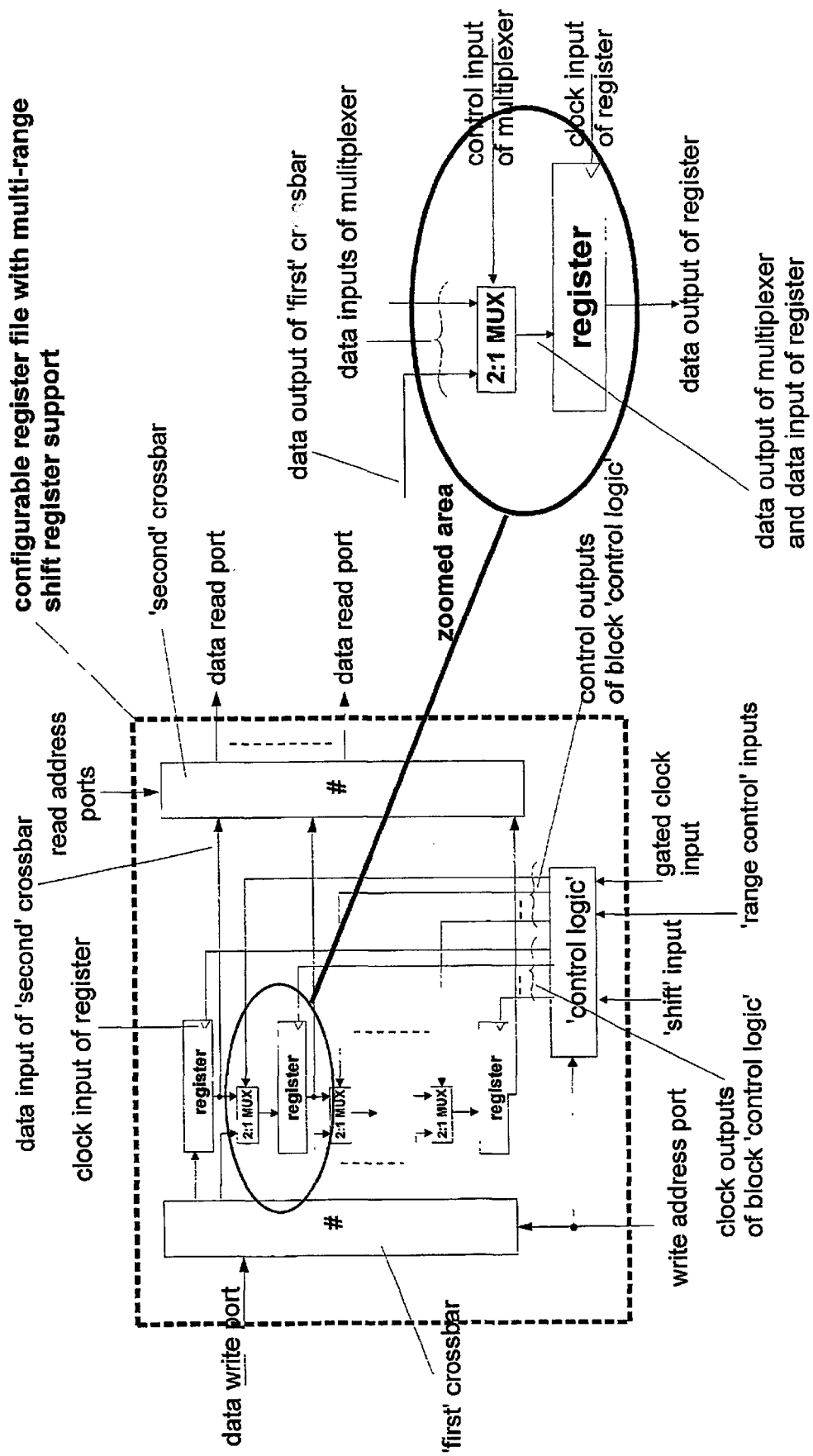
FIG. 2 shows a specific register transfer level architecture of a configurable register file as based on the present invention.

The main aspects of the present invention as well as the functionality of a configurable register file as based on the present invention is now described in more detail by referring to FIG. 2.

First some terminology related to a shift register is defined. Assume that a shift register contains m registers (m being a positive integer). The 'shift direction' of said shift register with m registers is defined to be an increasing order of register labels 1,2 ... m such that when the shift register is clocked by some clock signal, the contents of the registers pertaining to said shift register are shifted by one position in the 'shift direction', that is: any register with label i is shifted (written) into register with label i+1, this shifting taking place simultaneously for i=1,2, ... m−1. The so called 'first' register of the shift register is the register with label 1, the so called 'last' register of the shift register is the register with label m.

As already mentioned in section 2, although FIG. 2 shows a particular register transfer level architecture, the properties and the functionality of the register file as based on the present invention is independent thereof. Referring to FIG. 2, said register file has a gated clock input, a 'shift' input, one data write port, one or more data read ports, one write address port, one or more read address ports and 'range control' inputs. The exact meaning and functionality of said 'shift' input and 'range control' inputs will be explained later on. All other mentioned inputs and ports have the same meaning and functionality as explained in section 3.

Always referring to FIG. 2, said register file contains two crossbars, one at left and one at right in the following, the crossbar at left will be referred to by 'first' crossbar while the crossbar at right will be referred to by 'second' crossbar. Furthermore, said register file contains a set of registers and a set of 2:1 multiplexers and a block called 'control logic'. The block called 'control logic' itself has a clock input, a 'shift' input, a write address port, 'range control' inputs, clock and control outputs. The write address port of said block is connected to the write address port of said register file, said 'shift' input of said block is connected to the 'shift' input of said register file whereas the clock input of said block is connected to the gated clock input of said register file. The 'range control' inputs of said block are connected to the 'range control' inputs of said register file. The clock inputs of all registers are connected to the clock outputs of said block called 'control logic'. All other connections between said registers, multiplexers, said crossbars and said block called 'control logic' are further explained in the following.

Figure 1:
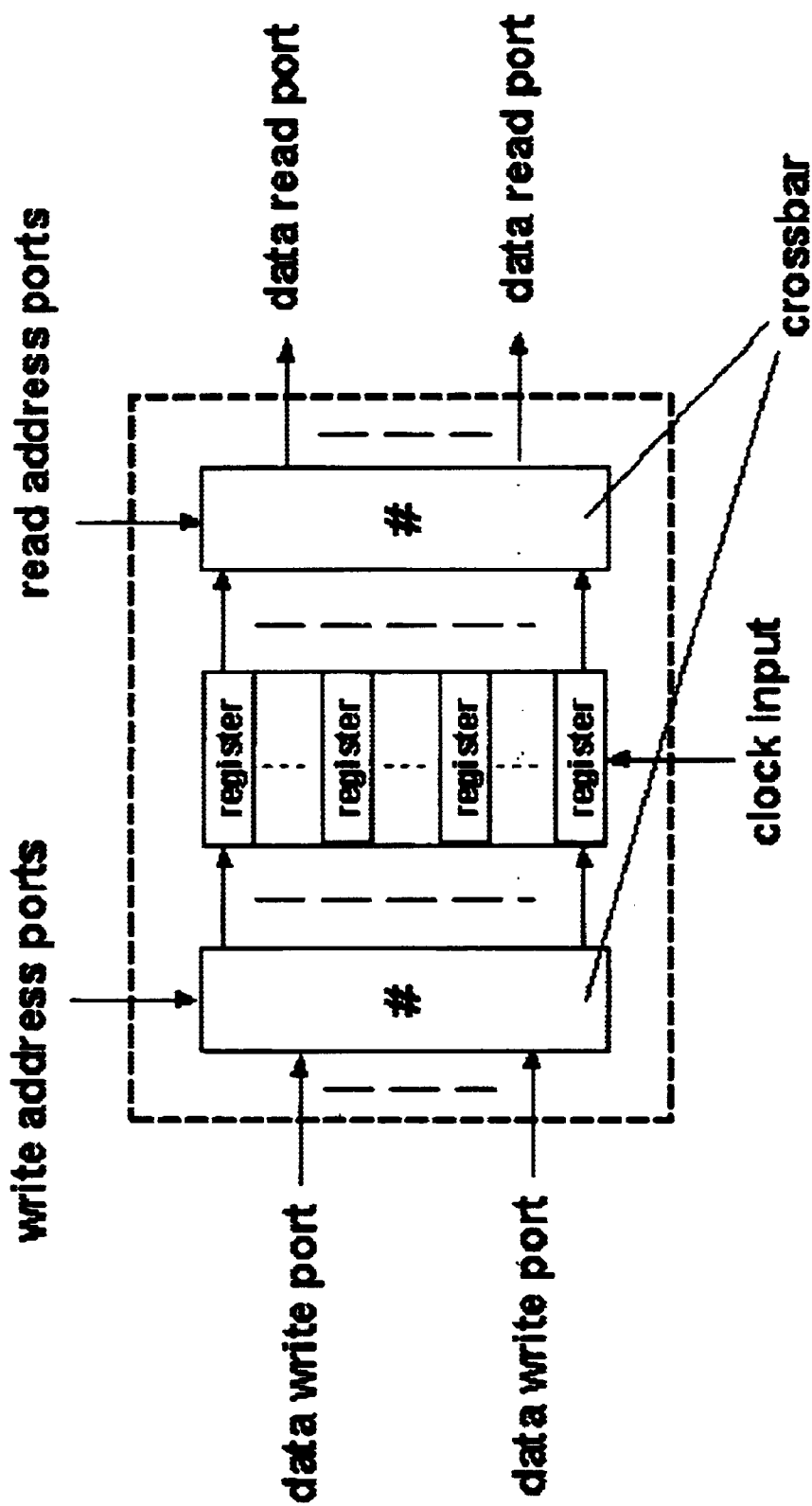
FIG. 1 shows the register transfer level architecture of a 'conventional' register file according to the prior art.

First, besides the property of being organized and accessible in the same way as registers in the case of a conventional register file as explained in section 3 and FIG. 1, registers of the register file as based on the present invention are configurable in the sense that they can be connected in such a way as to form one or more separate shift registers. The basic mechanism behind said configurability is as follows: assume that the register file has m registers and that we label said registers with integer labels 1 ... m. Now, the m−1 registers with labels 2 ... m are connected each one to a 2:1 multiplexer as follows: for each label i satisfying 2≦i≦m, the data input of the register with label i is connected to the data output of one of said multiplexers while the two data inputs of said multiplexer are connected to the data output of register with label i−1 and to a data output of said first crossbar respectively (see FIG. 2 for details). The data input of register with label 1 is only connected to a data output of said first crossbar. The control inputs of said multiplexers are connected to the control outputs of said block called 'control logic' while the clock inputs of all the registers are connected to the clock outputs of said block called 'control logic' (see FIG. 2). The exact functionality of said block called 'control logic' will be explained later on.

As one can see, the basic mechanism which allows said register file to be configurable in the sense mentioned above consists in setting the control inputs of said multiplexers such that either said multiplexers connect the data outputs of said first crossbar to the data inputs of said registers or said multiplexers connect the data outputs of said registers to the data inputs of other registers of said register file such that said registers with labels 1 ... m can form one or more separate shift registers, and where the before mentioned 'range control' inputs of said register file specify the number of separate shift registers to be formed The registers of said register file, configurable through the configuration mechanism relying on the before explained multiplexer circuitry, can now be made to form several and separate shift registers:

(1) by subdividing the range of contiguous register labels 1 ... m into sub-ranges, e.g. a first range containing labels 1 ... k, a second range containing labels k+1 . . . l, etc ...

(2) by making sure that, when an appropriate clock signal is applied to said gated clock input of said register file, not all registers but only those registers whose labels pertain to a specific sub-range are clocked and hence their contents shifted by one position into the shift direction of the shift register containing all said registers whose labels pertain to said specific sub-range. Furthermore, said specific sub-range is the one containing the label of the register selected by the signals applied to the write address port of said register file in case that an external value has to be written into said register. Furthermore, said registers of said specific range are only clocked and shifted if said 'shift' input and gated clock input are set to specific values and only if a value has to be written into said register. It is important to see that, if no writing is taking place, then no action is occurring in said register file, neither any register clocking nor any shifting.

(3) by specifying the number of sub-ranges and the limits (labels of first and last registers) of each sub-range by said 'control range' inputs of said register file In this way, all registers whose labels pertain to a same sub-range form a shift register. Since the subranges do not overlap, all shift registers are separate in the sense that they don't have any register in common. Hence, there are as many separate shift registers as there are sub-ranges. Of course, the sum of the registers contained in said shift registers can not exceed the number of registers contained in the register file.

The functionality of said register file is now explained in further detail. Assume that said register file contains in total m registers which are labeled upwards by 1 ... m. Furthermore, assume that the above explained mechanism to configure said registers to form one or more separate shift registers is implemented by using the multiplexer circuitry as explained above.

(1) As mentioned before, said 'range control' inputs of said block called 'control logic' (and hence of said register file) specify:

how many separate shift registers (or sub-ranges) have to be formed by the registers of said register file by using the above explained mechanism to configure registers of said register file the labels of the first and last register of each said shift register (or sub-range)

(2) assume that said 'range control' inputs specify that n (n being integer $\geq 1$) separate shift registers labeled 1 . . . n have to be formed, $f_i$ and $l_i$ denoting the labels of the first and last registers of shift register i respectively, where $1 \leq i \leq n$ and $1 \leq (f_i, l_i) \leq m$ and where the range of a shift register i is defined to be the set of registers whose labels j satisfy $f_i \leq j \leq l_i$. Furthermore, assume that the write address signals applied to the write address port of said register file selects a register pertaining to the range of shift register with label k. Two cases denoted by (A) and (B) must be distinguished:

(A): if said 'shift' input signal is set to an appropriate value (e.g. logical '0') then said block called 'control logic' forwards the clock signal applied to the clock input of said block only to the clock input of the register selected by said write address signals and sets the control input of one of said multiplexers such that said multiplexer connects a data output of said first crossbar to the data input of said register; furthermore, if the signal applied to said gated clock input presents some well defined waveform in time (usually a positive or negative edge), then the content of said register is overwritten with the value applied to the data write port of said register file, otherwise no overwriting is taking place; furthermore, all other registers of the register file are not clocked and hence do not change their contents.

(B): if said 'shift' input signal is set to another appropriate value (e.g. logical '1') then said block called 'control logic' forwards the clock signal applied to the clock input of said block only to the clock inputs of the registers with labels h . . . $l_k$ of said shift register k, where register with label h is the register selected by the signals applied to the write address port of said register file; furthermore the block 'control logic' sets its control outputs and hence also the control inputs of said multiplexers such that said multiplexers connect the data outputs and the data inputs of the registers having labels $f_k$ . . . $l_k$ in such a way that said registers form a shift register; furthermore, the contents of the registers with labels h . . . $l_k$ are shifted by one position in the shift direction, said shifting taking place only if the signal applied to said gated clock input presents some well defined waveform in time (usually a positive or negative edge); simultaneously to said shifting, the block called 'control logic' sets the control input of one of said multiplexers such that said multiplexer connects a data output of said first crossbar to the data input of said register with label h such that the content of said register is overwritten with the value applied to the data write port of said register file, said (over)writing taking place only if the signal applied to said gated clock input presents some well defined waveform in time (usually a positive or negative edge); furthermore all other registers of the register file are not clocked and thus do not change their contents.

It should be noted that during operation of said register file, said 'range control' inputs can change their values and specify a different register configuration from the configuration that was valid at some time before. Therefore, the registers which have to be clocked and (their contents) shifted following the event (action) of writing a value into a register of the register file are determined by the configuration in place during the time of said (over)writing, said configuration being specified by the signals applied to said 'range control' inputs during the time of said (over)writing.

Finally, it is important to see that, since the data output of each register of said register file is connected to an input of said second crossbar and that the data outputs of said second crossbar are connected to the data read ports of the register file, any combination of one or more registers of said register file can be simultaneously read out via the data read ports, independent of the signal applied to said 'shift' input, gated clock input and 'range control' inputs. As explained in section 3, the combinations of registers which can be read out depend only on the connections allowed by said second crossbar, in otherwords whether said second crossbar is partially or fully connected.

A small example shall clarify the above concepts. Assume that said register file contains 8 registers having labels 1 . . . 8. Assume that the 'range control' inputs specify that the registers of said register file have to be configured in such a way as to form 3 separate shift registers, the first shift register containing (or having a range of) 3 registers with labels 1, 2 and 3, the second shift register having a range of 2 registers having labels 4 and 5, the third shift register having a range of 3 registers with labels 6, 7 and 8. Assume that the write address signals applied to the write address port of said register file select the register with label 7. Since this register pertains to the third shift register as specified by the 'range control' inputs, it means that, depending on the value of the signal applied to said 'shift' input and provided that the signal applied to said gated clock input presents some well defined waveform in time (usually a positive or negative edge), the content of register with label 7 is shifted into register with label 8 and that simultaneously to said shifting the content of register 7 is overwritten by the value applied to the data write port of said register file. Note that although register with label 6 pertains also to the third shift register, it is however not clocked and hence does not change its content. Furthermore, all registers not pertaining to the third shift register are not clocked and hence do not change their contents. Similarly, if at a later stage the write address signals applied to the write address port of said register file select the register with label 1, then depending on the value of the signal applied to said 'shift' input and provided that the signal applied to said gated clock input presents some well defined waveform in time (usually a positive or negative edge), the content of register with label 1 shifted into register with label 2, the content of register with label 2 shifted into register with label 3, and simultaneously to said shifting the content of register 1 is overwritten by the value applied to the data write port of said register file. As before, all other registers are not clocked and do not change their contents.

By now it has become clear that a register file as based on the present invention has actually two working modes which can be active simultaneously: one working mode in which said register file behaves in the same way as a conventional register file as explained in section 3 and another working mode in which, in addition to the first one, the register file can be configured such that the registers form one or more separate shift registers.

Therefore, by abstracting from implementation specific details of the register transfer level architecture as shown in FIG. 2, it is now possible to describe the functionality of a configurable register file as based on the present invention in a fully equivalent way by defining two working modes, without referring to any specific register transfer level architecture:

(a) a first working mode which is active all the time and in which said register file behaves in the same way as a conventional register file, that is:

any register of said register file can be selected via the signals applied to the write address port of said register file such that the content of said register can be overwritten with the value applied to the data write port of said register file;

one or more registers of said register file can be selected simultaneously via the signals applied to the read address ports of said register file such that the contents which are stored inside said selected registers can be read out of said register file through the data read ports of said register file said actions of (over)writing and reading contents of registers of said register file usually take place only if the signal applied to said gated clock input of said register file presents some well defined waveform in time (usually a positive or negative edge)

(b) a second working mode which is becoming simultaneously active together with said first working mode if and only if the signal applied to said 'shift' input is set to a specific value (say logical '1') and which is defined as follows:

the registers of said register file are configured in such a way as to form one or more separate shift registers, the range of said shift registers being specified by said 'range control' inputs of said register file assume that the registers of said register file are labeled by 1 . . . m (m being a positive integer); furthermore assume that said 'range control' inputs specify that the registers of said register file have to be configured in order to form n (n being a positive integer) shift registers labeled 1 . . . n, the labels of the first and last registers of said shift registers being denoted by $f_i$ and $l_i$ respectively, with $1 \leq i \leq n$; furthermore assume that the register with label j (j being a positive integer) is the register selected by the signals applied to the write address port of said register file and that said register label j belongs to the range of shift register with label k if the signal applied to said gated clock input presents some well defined waveform in time (usually an positive or negative edge), then only the registers pertaining to the range of said shift register k and having labels j . . . $l_k$ are clocked and their contents shifted by one position into the shift direction of said shift register, where $l_k$ is the label of the last register of said shift register, all other registers of said register file with labels different from j . . . $l_k$ are not clocked and hence do not change their contents; simultaneously to said shifting, said register with label j is (over)written with the value applied to the data write port of said register file if the signal applied to said 'shift' input is not set to said specific value, then said second 'working mode' is not active and said register file is only in said first working mode if the signal applied to said gated clock input is set to another specific value (say logical '0'), then no shifting is taking place Although the actions of (over)writing register contents described so far, whether occurring during shifting or during writing of a value applied to the write port of said register file, are triggered by edge waveforms of said gated clock signal, other triggering mechanisms not relying on edge waveforms and/or relying on additional input signals are conceivable. However, it is important to see that the scope of the present invention, e.g. the functionality of said register file as described above, is independent of the triggering mechanisms chosen for (over)writing register contents.

Before concluding this section, it should be noted that in the previous description of said register file, the bit width of the data inputs and data outputs of said 2:1 multiplexers is equal to the bit width of the register outputs, register inputs and crossbar outputs to which they are connected. The same holds true for all other connections between building blocks shown in the register transfer level architecture of FIG. 2. E.g. if the bit width of the data inputs and outputs of said registers and crossbars is 16 bit, then the data inputs and outputs of said multiplexers are also 16 bit wide.

In summary, the main property of a configurable register file as based on the present invention consists in the fact that besides to behaving as a conventional register file, registers can be configured in such a way as to form one or more shift registers. Furthermore, the number and range of said shift registers can be changed by changing the signals to said 'range control inputs'. This property leads to the term 'multi-range shift register support' in the title of the present invention. The shifting of register contents thereby performs register renaming by hardware at almost no hardware overhead. Finally, the term 'configurable' in the title of the present invention stems of course from the fact that the registers of the register file can be configured such as to form one or more separate shift registers as described before.

What is claimed is:

1. A configurable register file with multi-range shift register support containing one data write port, one or more data read ports, one write address port, one or more read address ports, a gated clock input, a 'shift' input, one or more 'range control' inputs, two or more registers, the functionality of said register file being defined by two working modes, said two working modes being defined as follows:

(a) a first working mode which is active all the time and in which said register file behaves in the same way as a conventional register file, that is:

any register of said register file can be selected via the signals applied to the write address port of said register file such that the content of said register can be overwritten with the value applied to the data write port of said register file;

one or more registers of said register file can be selected simultaneously via the signals applied to the read address ports of said register file such that the contents which are stored inside said selected registers can be read out of said register file through the data read ports of said register file;

said actions of (over)writing and reading contents of registers of said register file usually take place only if the signal applied to said gated clock input of said register file presents some well defined waveform in time (usually a positive or negative edge);

(b) a second working mode which is becoming simultaneously active together with said first working mode if and only if the signal applied to said 'shift' input is set to a specific value (say logical '1') and which is defined as follows:

the registers of said register file are configured in such a way as to form one or more separate shift registers, the range of said shift registers being specified by said 'range control' inputs of said register file;

assume that the registers of said register file are labeled by 1 . . . m (m being a positive integer); furthermore assume that said 'range control' inputs specify that the registers of said register file have to be configured in order to form n (n being a positive integer) shift registers labeled 1 . . . n, the labels of the first and last registers of said shift registers being denoted by $f_i$ and $l_i$ respectively, with $1 \leq i \leq n$; furthermore assume that the register with label j (j being a positive integer) is the register selected by the signals applied to the write address port of said register file and that said register label j belongs to the range of shift register with label k;

if the signal applied to said gated clock input presents some well defined waveform in time (usually an positive or negative edge), then only the registers pertaining to the range of said shift register k and having labels j . . . $l_k$ are clocked and their contents shifted by one position into the shift direction of said shift register, where $l_k$ is the label of the last register of said shift register; all other registers of said register file with labels different from j . . . $l_k$ are not clocked and hence do not change their contents; simultaneously to said shifting, said register with label j is (over)written with the value applied to the data write port of said register file;

if the signal applied to said 'shift' input is not set to said specific value, then said second 'working mode' is not active and said register file is only in said first working modes;

if the signal applied to said gated clock input is set to another specific value (say logical '0'), then no shifting is taking place.

2. A register file as claimed in claim 1, containing four or more registers, said 'range control' inputs being able to specify the ranges of at least two separate shift registers.

3. A register file as claimed in claim 1, containing eight or more registers, said 'range control' inputs being able to specify the ranges of at least two separate shift registers.

4. A register file as claimed in claim 1, containing eight or more registers, said 'range control' inputs being able to specify the ranges of at least four separate shift registers.

* * * * *